United States Patent [19]
Callas

[11] Patent Number: 5,604,747
[45] Date of Patent: Feb. 18, 1997

[54] MODULAR CONTIGUOUS OUTPUT MULTIPLEXER

[75] Inventor: Michael C. Callas, Valencia, Calif.

[73] Assignee: Hughes Electronics, Los Angeles, Calif.

[21] Appl. No.: 608,163

[22] Filed: Feb. 28, 1996

[51] Int. Cl.$^6$ .................................................. H04J 1/00
[52] U.S. Cl. .......................... 370/297; 333/132; 333/135; 370/497
[58] Field of Search ................................... 333/126, 129, 333/132, 134, 135; 370/37, 123

[56] References Cited

U.S. PATENT DOCUMENTS

| | | | |
|---|---|---|---|
| 4,780,694 | 10/1988 | Kich et al. | 333/137 X |
| 5,438,572 | 8/1995 | Rauscher | 333/126 X |
| 5,440,281 | 8/1995 | Wey et al. | 333/126 |

*Primary Examiner*—Paul Gensler
*Attorney, Agent, or Firm*—Elizabeth E. Leitereg; Terje Gudmestad; Wanda K. Denson-Low

[57] ABSTRACT

A modular, multi-channel, contiguous output, multiplexer which combines directional filters with the diplexed output of two multi-channel multiplexers, each covering a contiguous frequency band, i.e., one is a low multiplexer and the other a high multiplexer, and one or more quasi-elliptical directional filters after the diplexer output to cover the hole left by the diplexer crossover. A preferred embodiment may essentially consist of: 1) a 12 channel contiguous multiplexer, either a hybrid directional and manifold type multiplexer or a short circuited multiplexer, covering frequencies, e.g., in the range from 3.7 GHz to 4.2 GHz; 2) a 6 channel contiguous multiplexer spanning frequencies substantially in the range from 3.42 GHz to 3.62 GHz; 3) a diplexer including a 6 section Chebyshev filter, with a passband of frequencies, e.g., in the range of 3.4 to 3.620 GHz, and about 30 dB attenuation at 3.7 GHz, and an 8 section Chebyshev filter passing frequencies, e.g., in the range of 3.7 GHz to 4.2 GHz, and providing 30 dB attenuation at 3.62 GHz; and 4) a spur free directional filter including a pair of quasi-elliptical filters that fill the crossover band without any effect on the previous components.

20 Claims, 2 Drawing Sheets

MODULAR CONTIGUOUS OUTPUT MULTIPLEXER

BACKGROUND OF THE INVENTION

1. Field of the Invention

The present invention relates to electronic signal multiplexers and more particularly to a modular multiplexer having a multi-channel contiguous output.

2. Problem to be Solved

In conventional short-circuited manifold multiplexers, as the number of channels is increased, the multiplexers begin to suffer from manifold resonances, the number of which increase with the number of channels. This resonance problem makes predicting and physically realizing multi-channel multiplexers difficult.

Similarly, with hybrid directional/manifold multiplexers, wherein odd/even (not contiguous) multiplexers have directional filters placed between channels (in frequency), these multiplexers are also limited by manifold resonances along with filter cavity spurs.

Further, when taking advantage of shaped reflector antenna technology, the shaped reflectors need an ever increasing number of continuously multiplexed channels. But, as noted above, with short-circuited manifold multiplexers channel performance decreases as more channels are added to an output manifold. At present the largest capacity on a manifold multiplexer at C-band is 12 channels.

It is therefore a problem in the art to increase the number of channels in multi-channel multiplexers without increasing the manifold resonances and filter cavity spurs.

Objects

It is an object of the present invention to provide a modular multiplexer having a large number of output channels with a contiguous output.

It is another object of the invention to provide a modular multiplexer having a large number of output channels with a minimum of undesirable manifold resonances and filter cavity spurs.

SUMMARY OF THE INVENTION

The present invention involves a modular multiplexer which combines directional filters with the diplexed output of two multi-channel multiplexers, each of which multiplexers covers a contiguous frequency band, i.e., one is a low multiplexer and the other a high multiplexer. Since simply diplexing the two multiplexers' outputs requires a guard band (around 2 channel bandwidths wide) at the diplexer crossover frequency, one or more quasi-elliptical directional filters are added after the diplexer output to cover the hole left by the diplexer crossover.

The preferred embodiment of the modular multiplexer of the invention essentially consists of four components: 1) a 12 channel contiguous multiplexer, preferably a hybrid directional and manifold type multiplexer, but which also could be a short-circuited multiplexer, covering frequencies substantially in the range from 3.7 GHz to 4.2 GHz; 2) a 6 channel contiguous multiplexer spanning frequencies substantially in the range from 3.42 GHz to 3.62 GHz; 3) a diplexer that consists of a 6 section Chebyshev filter, with a passband of frequencies substantially in the range of 3.4 to 3.620 GHz and about 30 dB attenuation at 3.7 GHz, and an 8 section Chebyshev filter passing frequencies substantially in the range of 3.7 GHz to 4.2 GHz and providing about 30 dB attenuation at 3.62 GHz; and 4) a spur free directional filter which may comprise a pair of quasi-elliptical filters that fill the crossover band without any effect on the previous components.

DETAILED DESCRIPTION OF THE INVENTION

Figure 1:
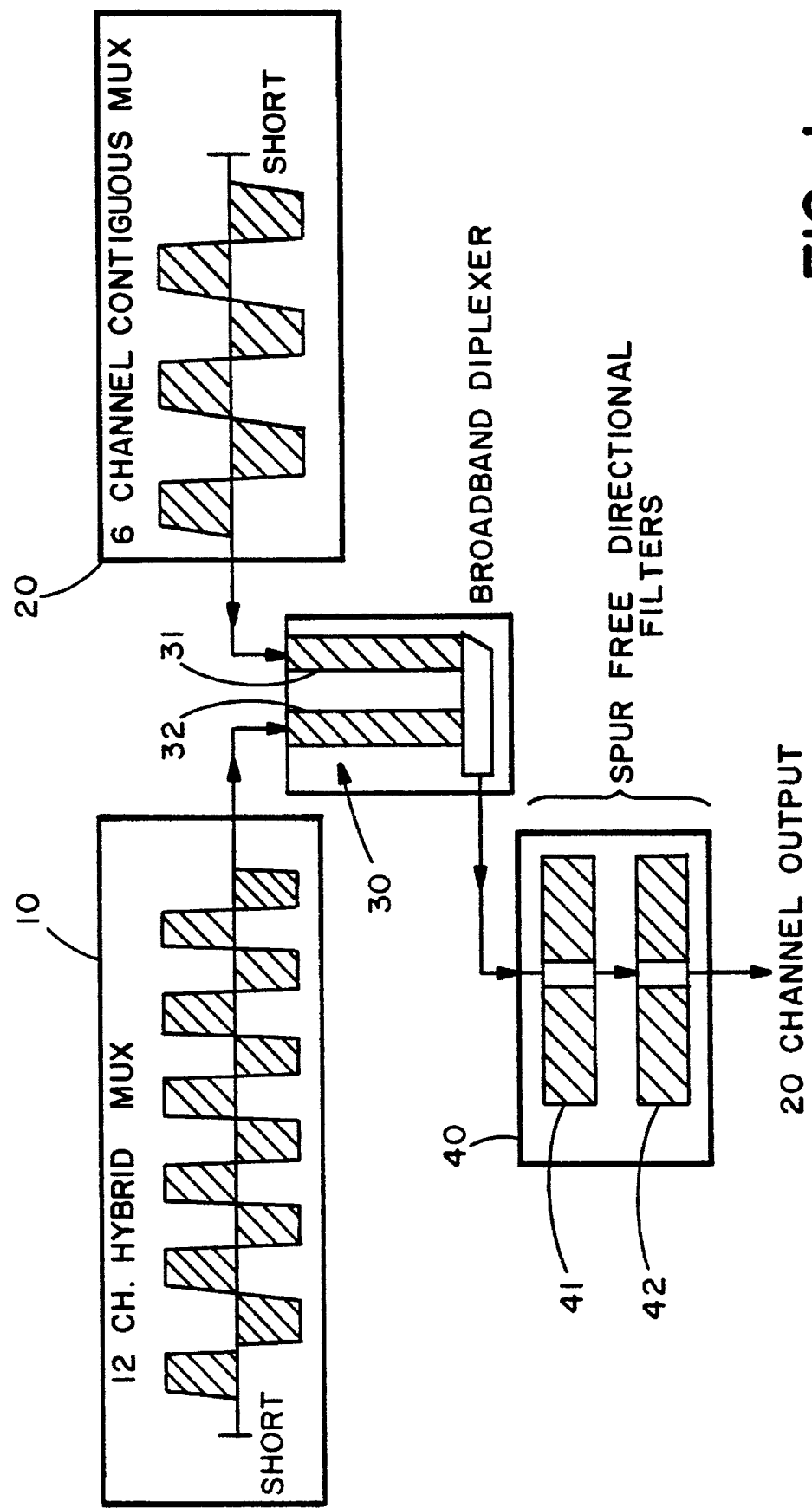
FIG. 1 is a representational diagram generally illustrating the four components making up the modular multiplexer of the present invention.

A modular multiplexer in accordance with the invention consists of four components as seen in the functional block representations in FIG. 1. The first component is a contiguous multiplexer 10, preferably a 12 channel hybrid directional and manifold type multiplexer, but a short-circuited multiplexer may also be used. This is a "high multiplexer" covering higher frequencies, e.g., substantially in the range from 3.7 GHz to 4.2 GHz.

The second component is a contiguous multiplexer 20, preferably of 6 channels and spanning lower frequencies, e.g., substantially in the range from 3.42 GHz to 3.62 GHz. This is the "low multiplexer" of the two multiplexer set.

The third component is a diplexer 30. It preferably includes a 6 section Chebyshev filter 31 with a passband of frequencies substantially in the range of 3.4 to 3.620 GHz. It also has about 30 dB attenuation at 3.7 GHz and is the "low" frequency channel on the diplexer. The "high" frequency channel on the diplexer may be an 8 section Chebyshev filter 32 passing frequencies substantially in the range of 3.7 GHz to 4.2 GHz and providing 30 dB attenuation at 3.62 GHz. The 30 dB attenuation points of the two filters are for spur rejection. These spurs are cavity modes (TM) that typically exist at 3.61 GHz for the high multiplexer 10 and 3.7 GHz for the low multiplexer 20. This spur rejection feature obviates the need to redesign the existing filter cavities from the current high Q design.

The fourth component is a spur free directional filter 40 which may comprise a pair of quasi-elliptical filters 41 and 42 of the type such as disclosed in U.S. Pat. No. 4,780,694, assigned to the same assignee as the present application. These final filters fill the crossover band without any effect on the previous components.

While the first component preferably has 12 channels and the third component has 6 section and 8 section filters, it will be understood that these components are not limited to those numbers.

Figure 2:
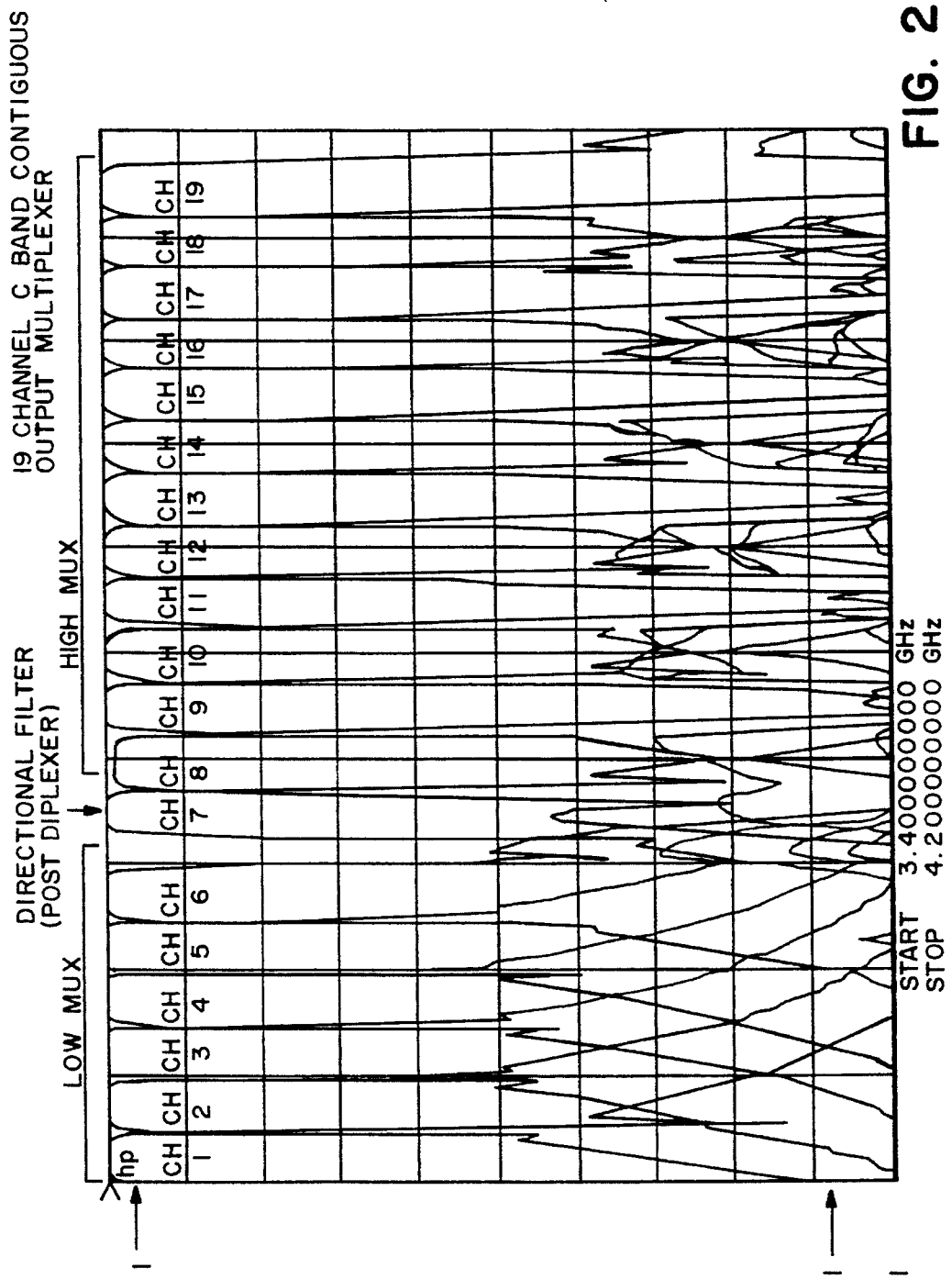
FIG. 2 is a plot illustrating the output of a 19 channel C-band contiguous output multiplexer in accordance with the invention.

FIG. 2 is a plot of the log of signal magnitude vs. frequency which illustrates the output of a 19 channel C-band contiguous output multiplexer in accordance with the invention. As seen therein, the lower six channels (CH1–CH6) correspond to the second component 20 of FIG. 1. The upper twelve channels (CH8–CH19) correspond to the first component 10 in FIG. 1. The intermediate channel CH7 corresponds to one of the directional filters, e.g., 41, in the fourth component 40. An additional filter, e.g., 42, can readily be added in the fourth component 40 to cover the remaining gap (between CH6 and CH7), as shown in FIG. 1, whereupon a 20 channel output results. Alternatively, the bandwidth of the single filter 41 can be increased to fill the remaining gap.

The invention is designed to take full advantage of shaped reflector antenna technology. Shaped reflectors need an ever increasing number of continuously multiplexed channels. The complexity of traditional, e.g., short-circuited, multiplexers increases and channel performance decreases as more channels are added to an output manifold so that at present the largest capacity on a manifold multiplexer is 12 channels, at C-band, 3–4 GHz frequency passband. While this passband has been selected for the preferred embodiment, the invention is not limited to this band and can be applied to other frequency bands.

The modular multiplexer of the invention uses existing lower order multiplexers, i.e., with less channels, and combines them with a diplexer while adding the directional filters for complete contiguous frequency coverage. This modular "building block" approach allows greater flexibility in many applications, e.g., on a spacecraft shelf. The smaller multiplexers can be placed near their SSPA's or TWTA's reducing the need for long runs of high loss coaxial cables.

The invention also allows wideband contiguous coverage to be spur free due to the diplexer spur rejection feature. Only the directional filters need to be spur free. Also maximum power levels are not reached in the system until the last directional filter section.

It is contemplated, for example, that application of the invention in current commercial C and Ku band output multiplexer product lines will allow the building of the largest capacity output multiplexers available. Also, the invention may find use in new spacecraft utilizing C and/or Ku band channels. A 19 channel contiguous C-band multiplexer has actually been assembled.

What is claimed is:

1. A modular multiplexer having a multi-channel contiguous output comprising:

at least two multi-channel contiguous multiplexer means for respectively outputting high and low contiguous ranges of passband frequencies;

a diplexer means, for receiving said contiguous high and low ranges of passband frequencies and comprising a high frequency passband filter, with high attenuation at the highest frequency of said range of low passband frequencies, and a low frequency passband filter, with high attenuation at the lowest frequency of said range of high passband frequencies; and spur free directional filter means for receiving the output of said diplexer means and providing a multi-channel contiguous output.

2. A multiplexer as in claim 1 wherein said high frequency range multiplexer means comprises a hybrid directional and manifold type multiplexer.

3. A multiplexer as in claim 1 wherein said high frequency range multiplexer means comprises a short-circuited multiplexer.

4. A multiplexer as in claim 1 wherein said high frequency range multiplexer means comprises 12 channels.

5. A multiplexer as in claim 1 wherein said high frequency range multiplexer means outputs a range of passband frequencies substantially in the range from 3.7 GHz to 4.2 GHz.

6. A multiplexer as in claim 1 wherein said low frequency range multiplexer means comprises 6 channels.

7. A multiplexer as in claim 1 wherein said low frequency range multiplexer means outputs a range of passband frequencies substantially in the range from 3.42 GHz to 3.62 GHz.

8. A multiplexer as in claim 1 wherein said diplexer means comprises an 8 section Chebyshev filter with a passband of frequencies substantially in the range of 3.7 GHz to 4.2 GHz with about 30 dB attenuation at 3.62 GHz.

9. A multiplexer as in claim 1 wherein said diplexer means comprises a 6 section Chebyshev filter with a passband of frequencies substantially in the range of 3.4 GHz to 3.62 GHz with about 30 dB attenuation at 3.7 GHz.

10. A multiplexer as in claim 1 wherein said spur free directional filter means comprises quasi-elliptical filter means for filling the crossover band of said diplexer means.

11. A modular multiplexer having a multi-channel contiguous output comprising:

multi-channel multiplexer means for outputting high and low contiguous ranges of passband frequencies;

a diplexer means, for receiving said contiguous high and low ranges of passband frequencies and highly attenuating said frequencies at the highest frequency of said range of low passband frequencies and at the lowest frequency of said range of high passband frequencies; and spur free directional filter means for receiving the output of said diplexer means and providing a multi-channel contiguous output.

12. A multiplexer as in claim 11 wherein said multi-channel multiplexer means comprises a hybrid directional and manifold type multiplexer.

13. A multiplexer as in claim 11 wherein said multi-channel multiplexer means comprises a short-circuited multiplexer.

14. A multiplexer as in claim 11 wherein said multi-channel multiplexer means comprises a contiguous multiplexer comprising 12 channels.

15. A multiplexer as in claim 11 wherein said multi-channel multiplexer means comprises a contiguous multiplexer comprising 6 channels.

16. A multiplexer as in claim 11 wherein said multi-channel multiplexer means comprises:

means for outputting said high range of passband frequencies substantially in the range from 3.7 GHz to 4.2 GHz; and means for outputting said low range of passband frequencies substantially in the range from 3.42 GHz to 3.62 GHz.

17. A multiplexer as in claim 11 wherein said diplexer means comprises:

a high frequency passband filter comprising an 8 section Chebyshev filter with a passband of frequencies substantially in the range of 3.7 GHz to 4.2 GHz and about 30 dB attenuation at 3.62 GHz; and a low frequency passband filter comprising a 6 section Chebyshev filter with a passband of frequencies substantially in the range of 3.4 to 3.620 GHz and about 30 dB attenuation at 3.7 GHz.

18. A multiplexer as in claim 11 wherein said spur free directional filter means comprises quasi-elliptical filter means for filling the crossover band of said diplexer means.

19. A method for producing a multi-channel contiguous output using a multi-channel multiplexer comprising the steps of:

respectively outputting high and low contiguous ranges of passband frequencies using at least two multi-channel contiguous multiplexers;

receiving said contiguous high and low ranges of passband frequencies using a diplexer and highly attenuating at the highest frequency of said range of low passband frequencies using a high frequency passband filter, and highly attenuating at the lowest frequency of said range of high passband frequencies using a low frequency bandpass filter; and receiving the output of said diplexer and providing a multi-channel contiguous output using a spur free directional filter.

20. The method of claim 19 wherein said high range of passband frequencies is substantially in the range from 3.7 GHz to 4.2 GHz;

said low range of passband frequencies is substantially in the range from 3.42 GHz to 3.62 GHz;

said high frequency passband filter comprises an 8 section Chebyshev filter passing frequencies substantially in the range of 3.7 GHz to 4.2 GHz with about 30 dB attenuation at 3.62 GHz; and said low frequency passband filter comprises a 6 section Chebyshev filter passing frequencies substantially in the range of 3.4 to 3.620 GHz with about 30 dB attenuation at 3.7 GHz.

* * * * *